US008839555B2

(12) United States Patent
Wang (10) Patent No.: US 8,839,555 B2
(45) Date of Patent: Sep. 23, 2014

(54) APPARATUS FOR TERRARIUM SYSTEMS

(76) Inventor: Neil Shumeng Wang, San Diego, CA (US)

( * ) Notice: Subject to any disclaimer, the term of this patent is extended or adjusted under 35 U.S.C. 154(b) by 179 days.

(21) Appl. No.: 13/475,509

(22) Filed: May 18, 2012

(65) Prior Publication Data

US 2013/0305605 A1 Nov. 21, 2013

(51) Int. Cl.
*A01G 9/14* (2006.01)
(52) U.S. Cl.
USPC .............................................. 47/69; 47/66.6
(58) Field of Classification Search
USPC ..................... 119/246; 47/66.6, 69, 17
See application file for complete search history.

(56) References Cited

U.S. PATENT DOCUMENTS 4,117,805 A * 10/1978 Ward ............................ 119/246
4,754,571 A * 7/1988 Riechmann .................... 47/59 R
6,006,471 A * 12/1999 Sun .................................. 47/69
2003/0150394 A1* 8/2003 Wolfe ............................ 119/246

* cited by examiner

*Primary Examiner* — Kristen C Hayes (57) ABSTRACT

An integrated environmental sustaining apparatus for maintaining a terrarium is adapted to simultaneously regulate temperature and deliver water droplets. The apparatus includes three major systems; a thermoelectric device, a water droplet delivery system, and a thermostat. The thermoelectric device is used to release heat or absorb heat. The water droplet delivery system includes a water pump, a water pipe and at least one water droplet dispersing device connected to the water pipe. A section of the water pipe is coupled to the thermoelectric device such that water flowing inside the water pipe will thermally communicate with the thermoelectric device. The thermostat is used to power on or off the thermoelectric device and the water pump in response to the temperature measurement inside the terrarium in relation to a predetermined temperature range determined by a low-temperature setting and a high temperature setting that can be programmed into the thermostat.

9 Claims, 9 Drawing Sheets

FIG. 1

FIG. 9

APPARATUS FOR TERRARIUM SYSTEMS

BACKGROUND OF THE INVENTION

The present invention, in general relates to an apparatus for maintaining desirable environmental conditions suitable for a terrarium, and more particularly, to an integrated environmental sustaining apparatus that can simultaneously regulate temperature levels inside and can deliver water droplets to a terrarium.

A terrarium is a man-made, enclosed habitat suitable for keeping and raising plants and animals for observation or research. Typically, the temperature and relative humidity levels inside the terrarium must be maintained within a certain predetermined range. Further, delivery of water droplets in the form of rain or mist may be required to mimic a natural environment to maintain optimum conditions for the plants and animals inside the terrarium.

Temperature control is achieved by either a global control mechanism or a local control mechanism. If a terrarium environment is kept inside a room, the entire room can be kept within a pre-determined temperature range by a conventional air conditioning system that can provide both heating and cooling. Air internal to the terrarium will generally reach thermal equilibrium with room air surrounding the terrarium with the aid of either natural convection or forced convection (i.e. a forced air circulation system inside the terrarium) between container walls and air inside the terrarium. Such a global temperature control system, when properly sized and controlled, works well. Since the global temperature control system keeps the room, in addition to the terrarium within a predetermined temperature range, operating cost is relatively high. More importantly, the existence or the wellbeing of the terrarium depends on the existence of the room air conditioning system.

Alternatively, temperature control of a terrarium can be achieved locally, independent of the room environment within which the terrarium resides.

One way to maintain the air temperature inside a terrarium above a predetermined low temperature setting in a cold weather is to apply one or more heat pads to one or more exterior walls of a terrarium. When heat pads are powered on, heat is transferred from the pads to the walls primarily through conduction, and from the heated walls to the interior air through natural or forced convection depending on whether there exists a forced air circulation system inside the terrarium. A thermostat is typically used to control power to the heat pads based on temperature measurements inside the terrarium by one or more temperature sensors.

To maintain the air temperature below a predetermined high temperature setting in warm or hot weather, cooling must be provided to the terrarium. Conventional compressor based air cooling system can be used to remove heat from inside the terrarium. Efficient delivery of cooling is typically achieved by a forced air circulation system that generally includes a fan/blower and ductwork that is thermally coupled with the cooling generating system.

For humidity control, since a terrarium is generally a significantly enclosed container, humidity can simply be maintained at a high level that is suitable for a terrarium as long as there is water in the container.

However, providing rain or mist to terrarium must be accomplished independent of temperature regulating mechanism. Typically, rain or mist is provided to a terrarium system by a water droplet delivery system driven by a water pump. Generally, the terrarium can be adapted to support an internal water reservoir that is deep enough to keep the inlet of the water pump submerged; water can be drawn from the internal reservoir to provide rain and mist. In a well-covered terrarium, there is generally very little evaporation from inside of the terrarium to the outside, and the terrarium is generally kept in an equilibrium state in terms of overall water level. As such rain or mist can be provided as frequently as needed without frequent human intervention to add water into the terrarium.

In summary, to maintain a terrarium, one will need a temperature regulating system which comprises one or more devices that can generate heating and cooling and, for a local temperature regulating system, an air circulating system to deliver heating or cooling air inside the terrarium. One will also need a rain/mist generating system. Typically, the temperature regulating system is controlled by a thermostat and the rain/mist generating system by a time control device, or a timer. As such, a typical terrarium maintenance system comprises at least two separate sub-systems that are controlled separately.

Therefore, there exists a need for an integrated environmental sustaining apparatus for terrarium systems to simplify terrarium maintenance.

BRIEF SUMMARY OF THE INVENTION

The primary objective of the present invention is to provide an integrated apparatus that can simultaneously regulate temperature to within a pre-determined temperature range and can generate and deliver water droplets to a terrarium. The apparatus has a thermoelectric device that can release heat (heat) or absorb heat (cool) depending on how the device is connected to a direct current (a.k.a. DC) power source, and a water circulation and water droplet discharging system that is thermally coupled with the thermoelectric device in such a way that the circulating water can exchange energy with the heating/cooling surface of the thermoelectric device. The integrated apparatus further comprises a control device such as a thermostat that activates or deactivates the thermoelectric device and the water circulating device simultaneously depending on the temperature inside the terrarium.

The various objectives and advantages of the present invention will be more readily understood from the following detailed description when read in conjunction with the appended drawings.

BRIEF DESCRIPTION OF THE SEVERAL VIEWS OF THE DRAWING

The invention is described in greater detail hereinafter by reference to the accompanying drawings wherein.

DETAILED DESCRIPTION OF THE INVENTION

An integrated environmental sustaining apparatus for use in a terrarium system with an enclosure in accordance with the present invention has a plurality of systems and elements which will be identified herein below.

Figure 1:
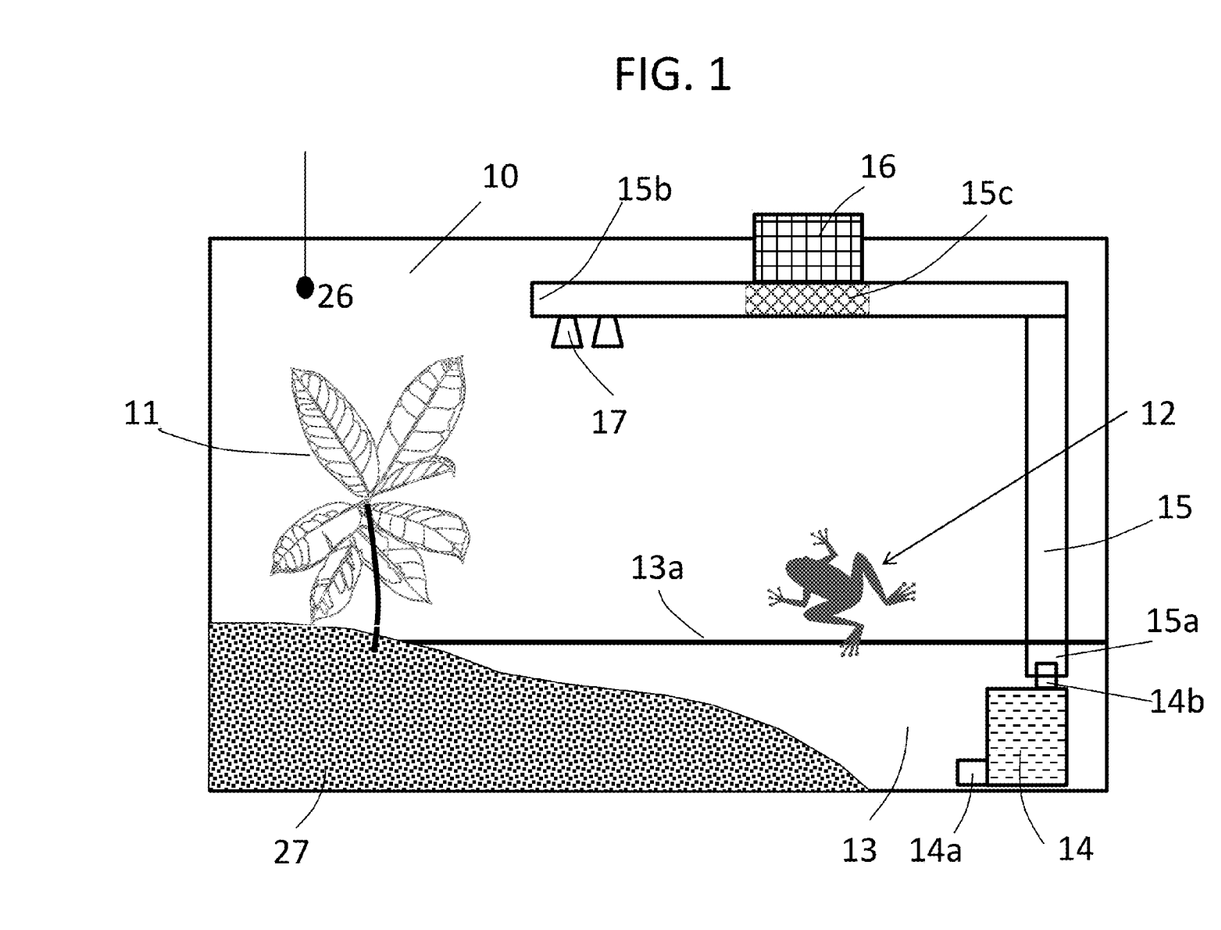
FIG. 1 is a schematic diagram of one embodiment of an integrated water droplet dispensing and heating/cooling apparatus for a terrarium that includes plants, and animals and an internal reservoir.

Referring to FIG. 1 the system comprises a terrarium enclosure 10. Inside the terrarium enclosure 10, there are plants identified with reference numeral 11, and animals identified with reference numeral 12. At the bottom of the enclosure 10, there is a mound of dirt 27 to support the plants 11 and a reservoir 13 which has a water level identified with a reference numeral 13a. A water pump 14 has its intake end 14a submerged in the reservoir 13 below the water level 13a. One end 15a of a water pipe 15 is connected to the outlet end 14b of the water pumper. Following the water flow direction inside the water pipe 15 when the water pump 14 is turned on, downstream of the outlet 14b there is an intermediate section 15c of water pipe 15 that is attached to a thermoelectric device 16. And further downstream towards the end 15b of the water pipe 15 that is substantially raised above the reservoir 13 and close to the top of the enclosure 10, there are water droplet dispersing heads 17 that are designed to deliver rain or mist when the water pump 14 is powered on. As such, when water pump 14 is powered on, water is drawn from the water reservoir 13 by the water pump 14, and is pushed through the water pipe 15 and past the intermediate section 15c, finally to the water droplet dispersing heads 17 to provide the required rain or mist. Further, there is at least one temperature sensor 26 that measures ambient air temperature inside the terrarium 10.

Figure 2:
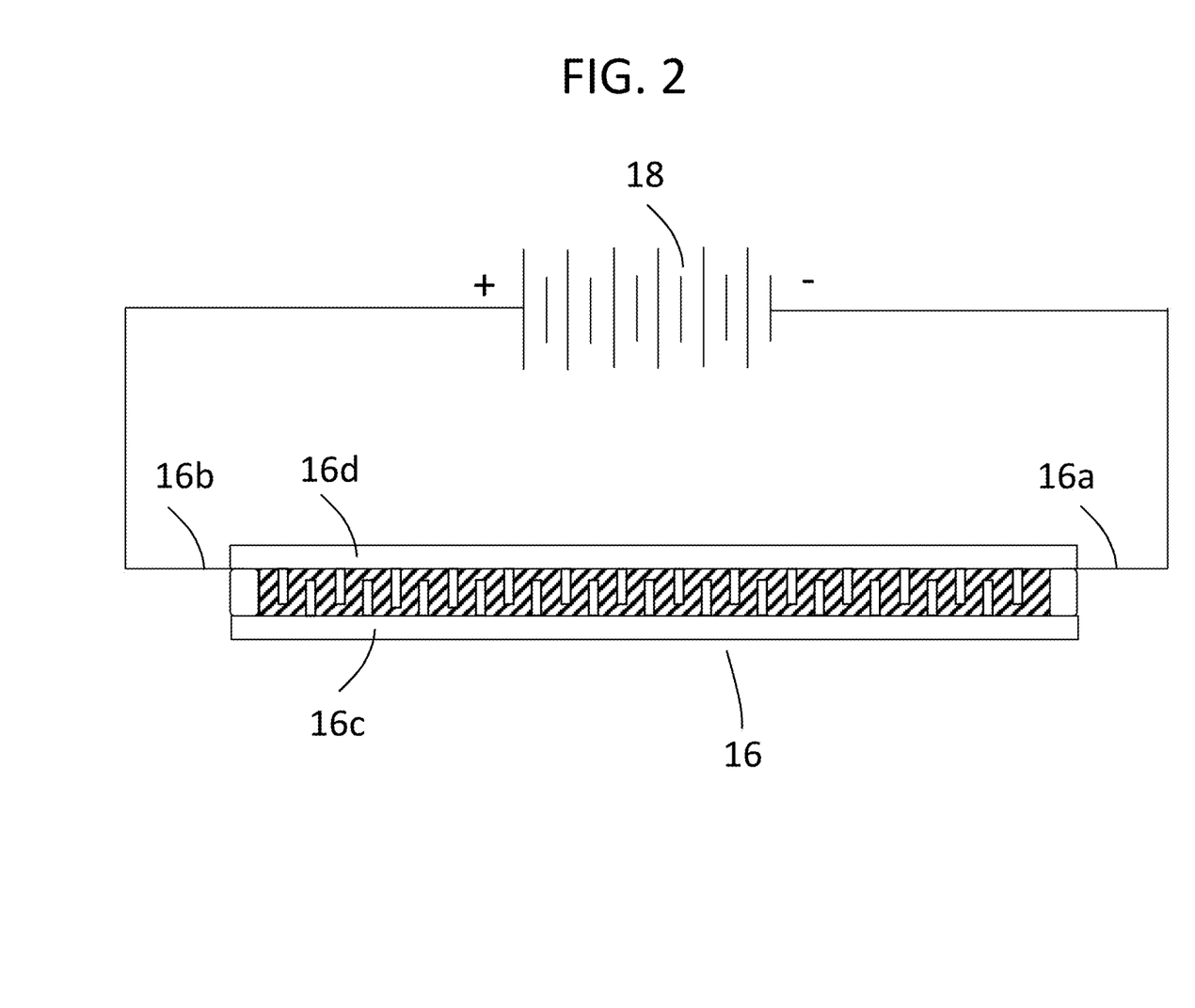
FIG. 2 is a schematic diagram of a thermoelectric device connected to a DC power source.
Figure 3:
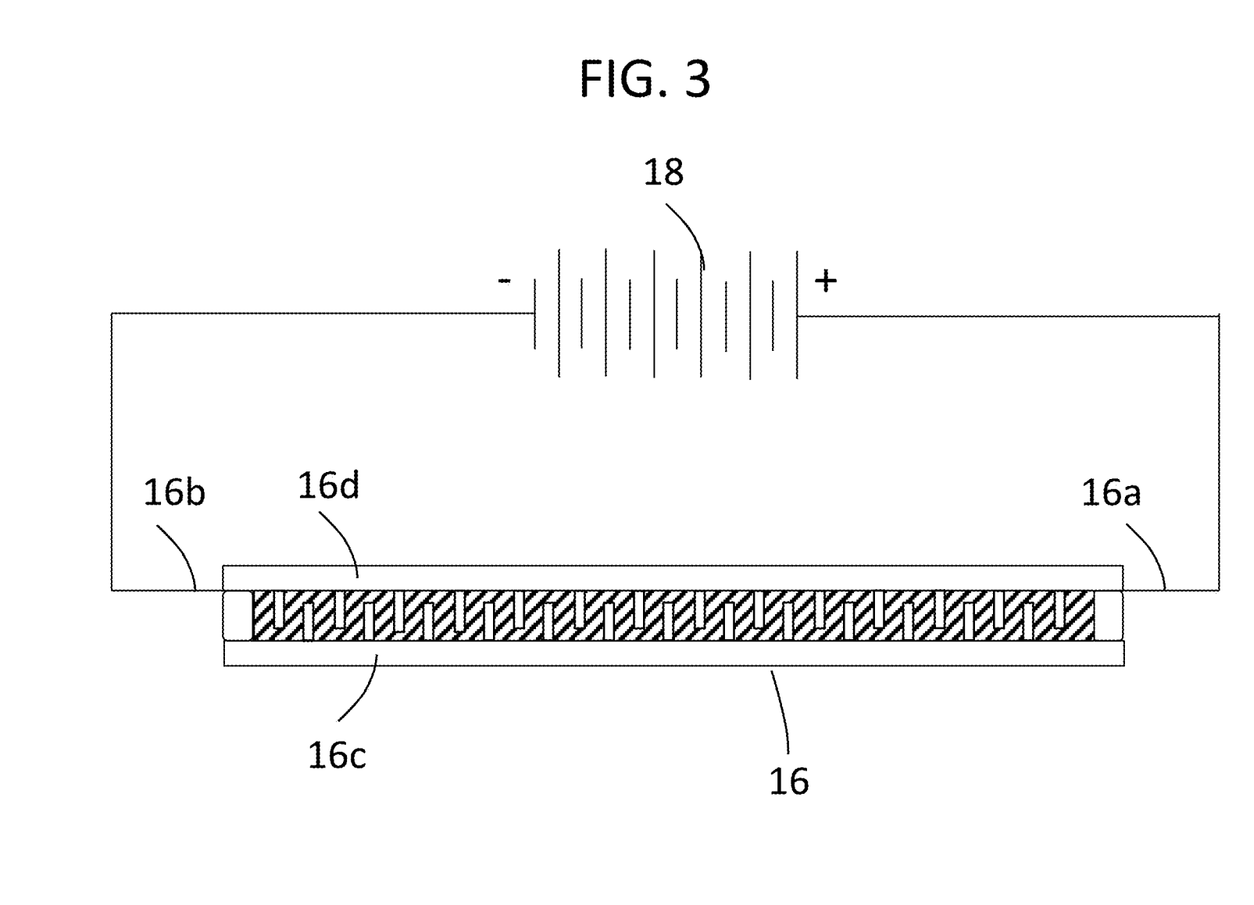
FIG. 3 is a schematic diagram of a thermoelectric device connected to a DC power source in a reversed polarity with reference to FIG. 2.

FIG. 2 illustrates the details of the thermoelectric device 16. The thermoelectric device 16 is powered by a direct current or DC power supply 18 through two wires 16a and 16b. When connected to the DC power supply 18 as shown in. FIG. 2 where 16a is connected to the negative terminal of the DC source and 16b to the positive terminal, the thermoelectric device 16 has a heat-releasing side 16d and a heat-absorbing side 16c. Alternatively, when the thermoelectric device 16 is wired as shown in FIG. 3 where 16a is connected to the positive terminal of the DC source and 16b to the negative terminal, the thermoelectric device 16 has a heat-releasing side 16c and a heat-absorbing side 16d.

Figure 4:
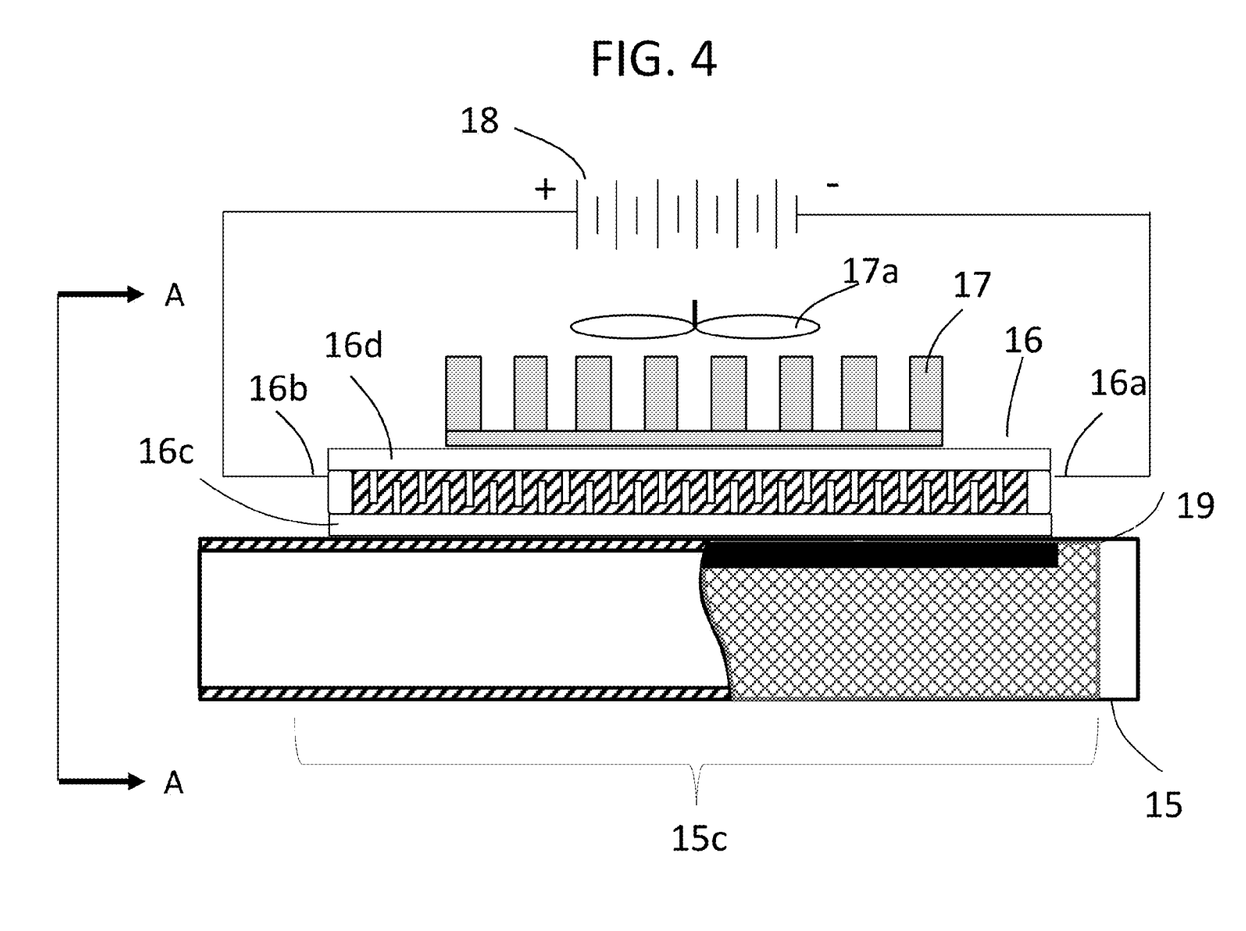
FIG. 4 is a schematic diagram of a thermoelectric device with one side attached to a section of a water pipe and the other side attached to a heatsink and an air moving device on top of the heatsink for further enhancing heat transfer.

FIG. 4 shows that the side 16c of the thermoelectric device 16 is attached to the intermediate section 15c of the water pipe 15. In order to enhance heat transfer, at least the section 15c of the water pipe 15 is preferably made of thermally conductive materials such as copper. To securely attach the section 15c to the surface 16c and further enhance thermal coupling, an adhesive material or an interface material 19 with enhanced thermal conductivity, such as a thermal conductive epoxy is used. In this embodiment, the water pipe 15 is made of a single material from end 15a to end 15b including the intermediate section 15c. A variety of forms of heat dissipation means may be provided to the side 16d of thermoelectric device 16 for improving heat exchange efficiency. As shown in FIG. 4 as one specific example, extended surfaces or heat dissipation fins 17 are fitted to the side 16d, and the heat dissipation fins 17 are exposed to the ambient air outside the enclosure 10. Moreover, an air moving device 17a, such as a fan or a blower is provided to force airflow over and through the fins 17 to facilitate further enhanced heat transfer between the fins 17 and the ambient air.

When cooling of the terrarium 10 is required, the wires 16a and 16b are connected to the DC source 18 in such a way that the 16c is the heat-absorbing side (with reference to FIG. 2), thus absorbing heat from the water flowing through the section 15c. When heating of the terrarium 10 is required, the wires 16a and 16b are connected to the DC source 18 in such a way that the 16c is the heat-releasing side (with reference to FIG. 3), thus heating the water flowing through the section 15c. At the same time, the side 16d is the heat-releasing side. With the aid of heat dissipation fins 17, heat released from side 16d is efficiently dissipated into the ambient air outside the enclosure 10.

Figure 5:
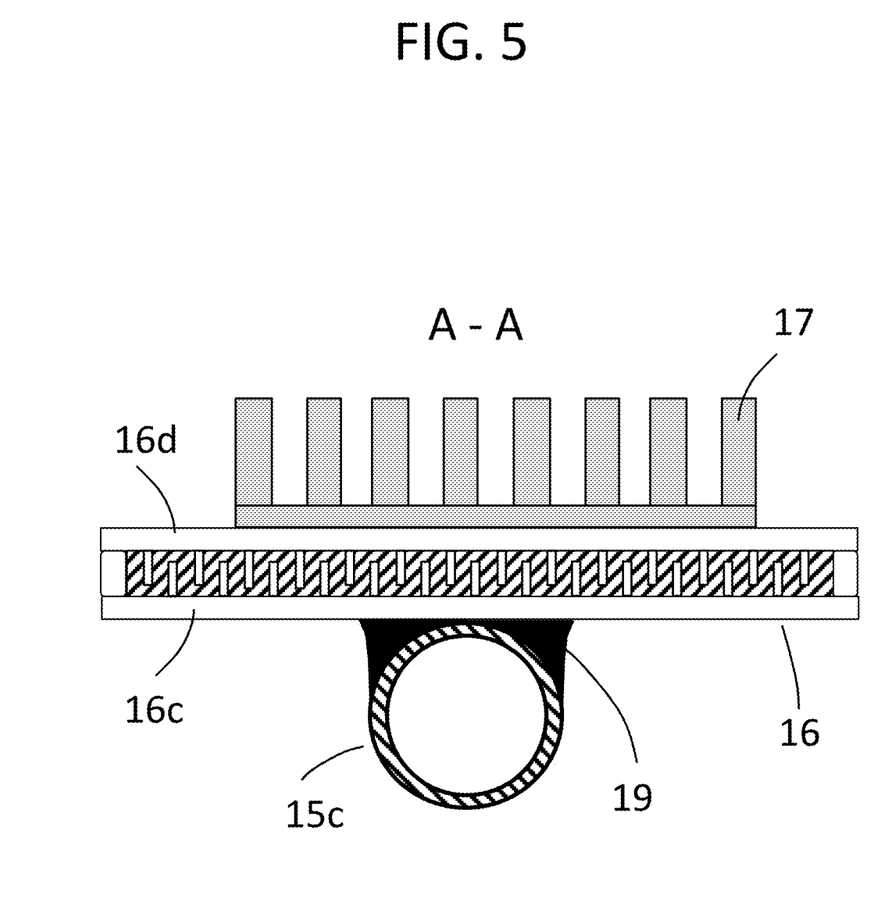
FIG. 5 is a schematic diagram of the side view of FIG. 4 showing the cross section area of the water pipe attached to one surface of the thermoelectric device, where the cross section of the water pipe is substantially round shape.

FIG. 5 shows the cross section of the section 15c thermally attached to the side 16c of the thermoelectric device 16. The section 15c is shown to be substantially circular shaped. The section 15c is attached to the surface of 16c of the thermoelectric device 16 with an adhesive material 19 that is also substantially thermally conductive such that the effective contact surface area between the section 15c and the surface 16c is maximized or the heat resistance between the outer surface of the section 15c and the surface of 16c is minimized.

Figure 6:
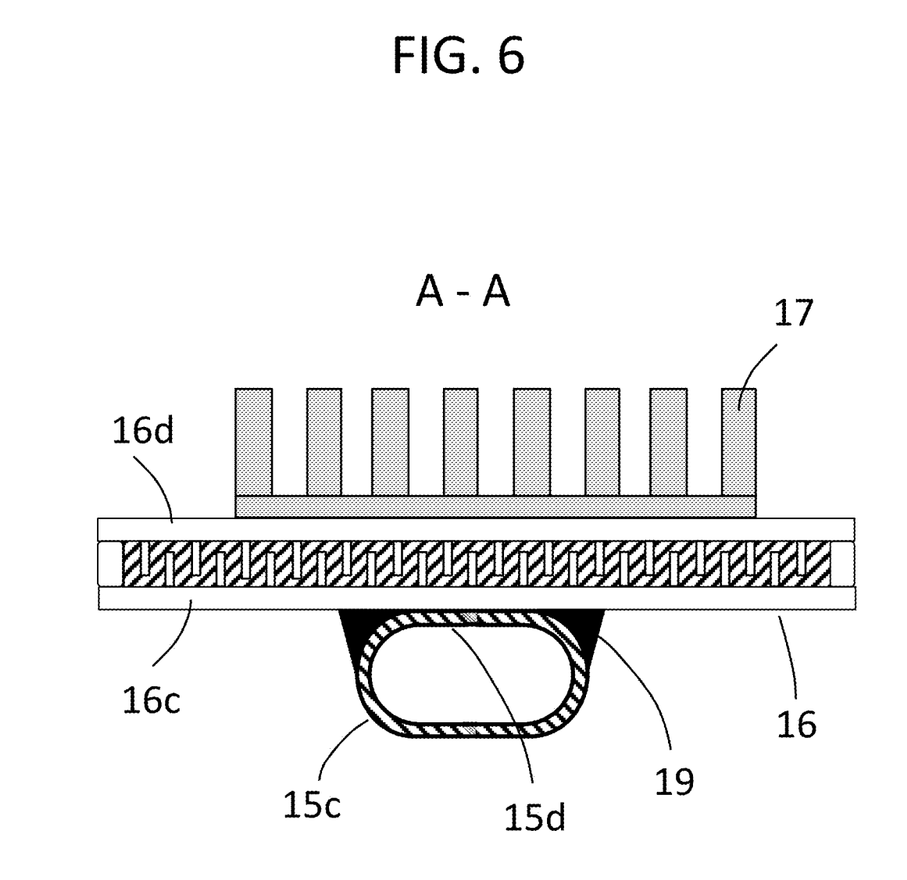
FIG. 6 is a schematic diagram of the side view of FIG. 4 showing the cross section area of the water pipe attached to one surface of the thermoelectric device, where the cross section of the water pipe is substantially elongated oval shape.

FIG. 6 shows the cross section of the section 15c thermally attached to the side 16c of the thermoelectric device 16. The section 15c is shown to be substantially oval shaped that has at least one substantially flat surface 15d which is attached to the surface of 16c of the thermoelectric device 16 with an adhesive material 19 that is also substantially thermally conductive such that the effective contact surface area between the section 15c and the surface 16c is maximized or the heat resistance between the outer surface of the section 15c and the surface of 16c is minimized.

Figure 7:
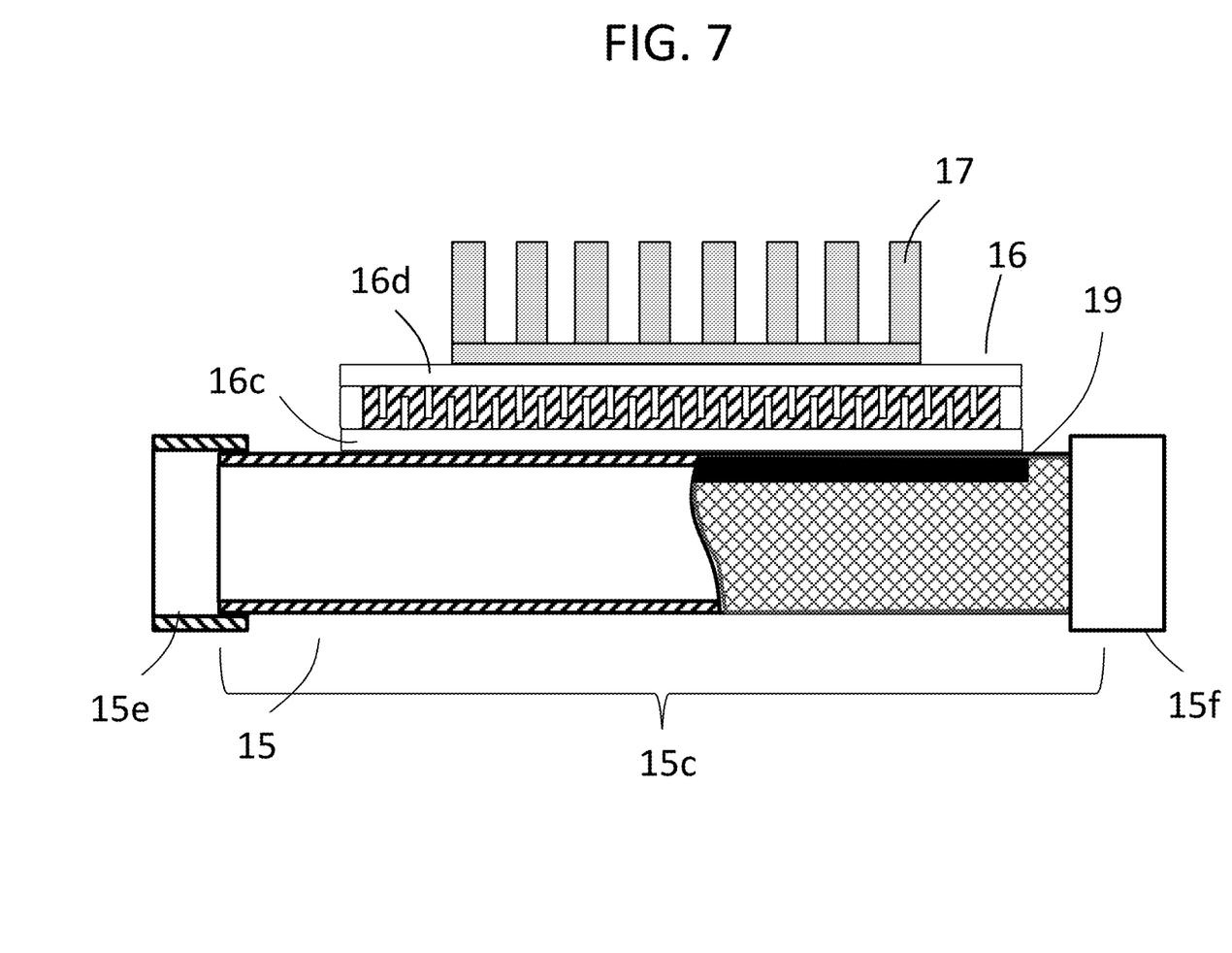
FIG. 7 is a schematic diagram of a section of a water pipe attached along one surface of a thermoelectric device, where this section of the water pipe is shown to be connected at both ends to water pipe sections of different outside diameter indicating that this section of water pipe and those connected to it are made of different materials.

FIG. 7 shows an embodiment that is different from that is shown in FIG. 4. In this embodiment the intermediate section 15c and sections 15e and 15f connecting both ends of section 15c are made of different materials. For instance, the section 15c copper while 15e and 15f and the rest of the water pipe 15 are all made of plastic.

Figure 8:
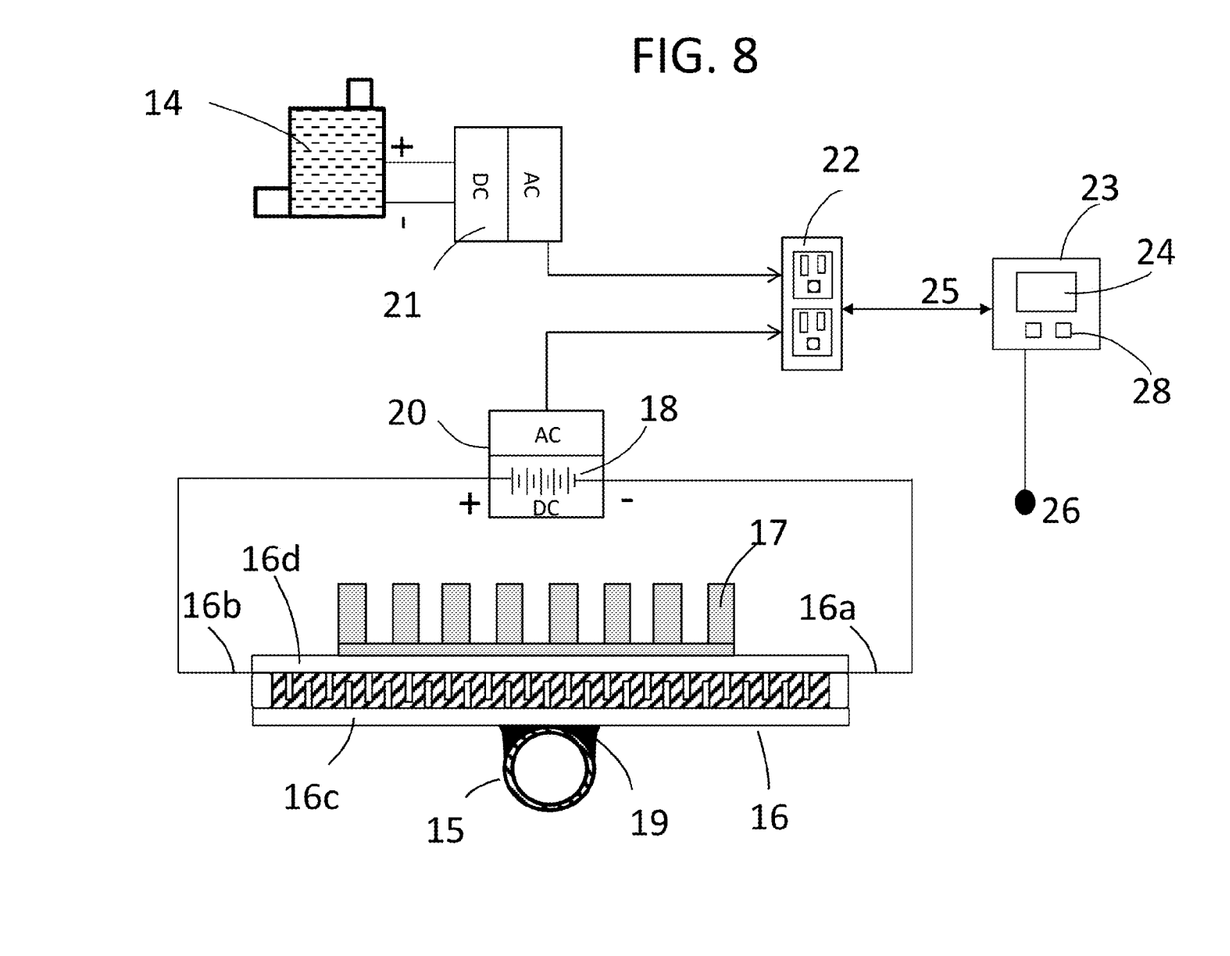
FIG. 8 is a schematic of a control diagram with a thermostat controlling a power supply source to which a water pump and a thermoelectric device are electrically connected.

FIG. 8 illustrates the overall control system for the integrated environmental sustaining apparatus. The water pump 14 is powered typically by a direct current source or DC side of an AC to DC adapter 21. The thermoelectric device is powered typically by a direct current power or DC side 18 of an AC to DC adapter 20. Both adapters 20 and 21 are plugged into a common AC power input panel 22. The thermostat 23 is preferably a digital thermostat that includes a display 24, an input device 28 for inputting temperature settings, at least one actuating member 25, and at least one temperature sensor 26. Through the input device 28, the thermostat 23 is adapted to receive and store one or more temperature range settings. For example, using the input device 28, the thermostat 23 is able to receive and store a high temperature setting (e.g. 80 F) and a low temperature setting (e.g. 60 F). The temperature ranges are used control the AC power input panel 22 which in turn controls the on and off of the thermoelectric device 16 and the water pump 14.

In winter time, the thermoelectric device 16 is wired as illustrated in FIG. 2 such that the surface 16c is a heat-releasing side when power is provided. When the ambient temperature measured by the sensor 26 inside the terrarium enclosure 10 remains between the high (e.g. 80 F) and the low temperature (e.g. 60 F) settings, the AC input panel 22 remains inactivated, and the pump 14 and the thermoelectric device 16 remain powered off. If the ambient temperature measured by the sensor 26 falls below the low temperature (e.g. 60 F) setting, the thermostat 24 triggers the actuator 25 to activate AC power input panel 22. The water pump 14 is powered on, drawing water from the reservoir 13 into the water pipe 15, pushing the water past the section 15C that is thermally attached to the thermoelectric device 16. At the same time, the thermoelectric device 16 is also powered on, and the heat-releasing surface 16c becomes hot and transfers heat to the water flowing inside the pipe 15. The water passing through the thermoelectric device 16 picks up heat and is sent to the water droplet dispersing heads 17. Warm water droplets will heat the ambient air inside the terrarium. Ambient temperature inside the terrarium environment will rise as a result, and will eventually rise above the low temperature setting (e.g. 60 F). At that point, the thermostat 23 will trigger the actuator 25 to turn off the power supply to the AC power input panel 22. The water pump 14 is powered off stopping water droplet dispersing, and the thermoelectric device is powered off stopping the heating process from the heat-releasing surface 16c.

In summer time, the thermoelectric device 16 is wired as illustrated in FIG. 3 such that the surface 16c is a heat-absorbing side when power is provided. When the ambient temperature measured by the sensor 26 inside the terrarium enclosure 10 remains between the high (e.g. 80 F) and the low (e.g. 60 F) temperature settings, the AC input panel 22 remains inactivated, and the pump 14 and the thermoelectric device 16 remain powered off. If the ambient temperature measured by the sensor 26 exceeds the high temperature (e.g. 80) setting, the thermostat 24 triggers the actuator 25 to activate AC power input panel 22. The water pump 14 is powered on, drawing water from the reservoir 13 into the water pipe 15, pushing the water past the section 15c that is thermally attached to the thermoelectric device 16. The thermoelectric device 16 is also powered on, and the heat-absorbing surface 16c gets cold and draws heat from the water flowing inside the pipe 15. The water passing through the thermoelectric device 16 releases heat to the heat-absorbing surface 16c and the cooled down water is sent to the rain or mist heads 17. Cool water droplets coming out from the water droplet dispersing heads 17 absorbs heat from the ambient air achieving the goal of cooling the terrarium environment. Ambient temperature inside the terrarium environment will drop as a result to below the high temperature (e.g. 80 F) setting. At that point, the thermostat 23 will trigger the actuator 25 to turn off the power supply to the AC panel 22. The water pump 14 is powered off stopping water droplet dispersing, and the thermoelectric device is powered off stopping the cooling process.

Figure 9:
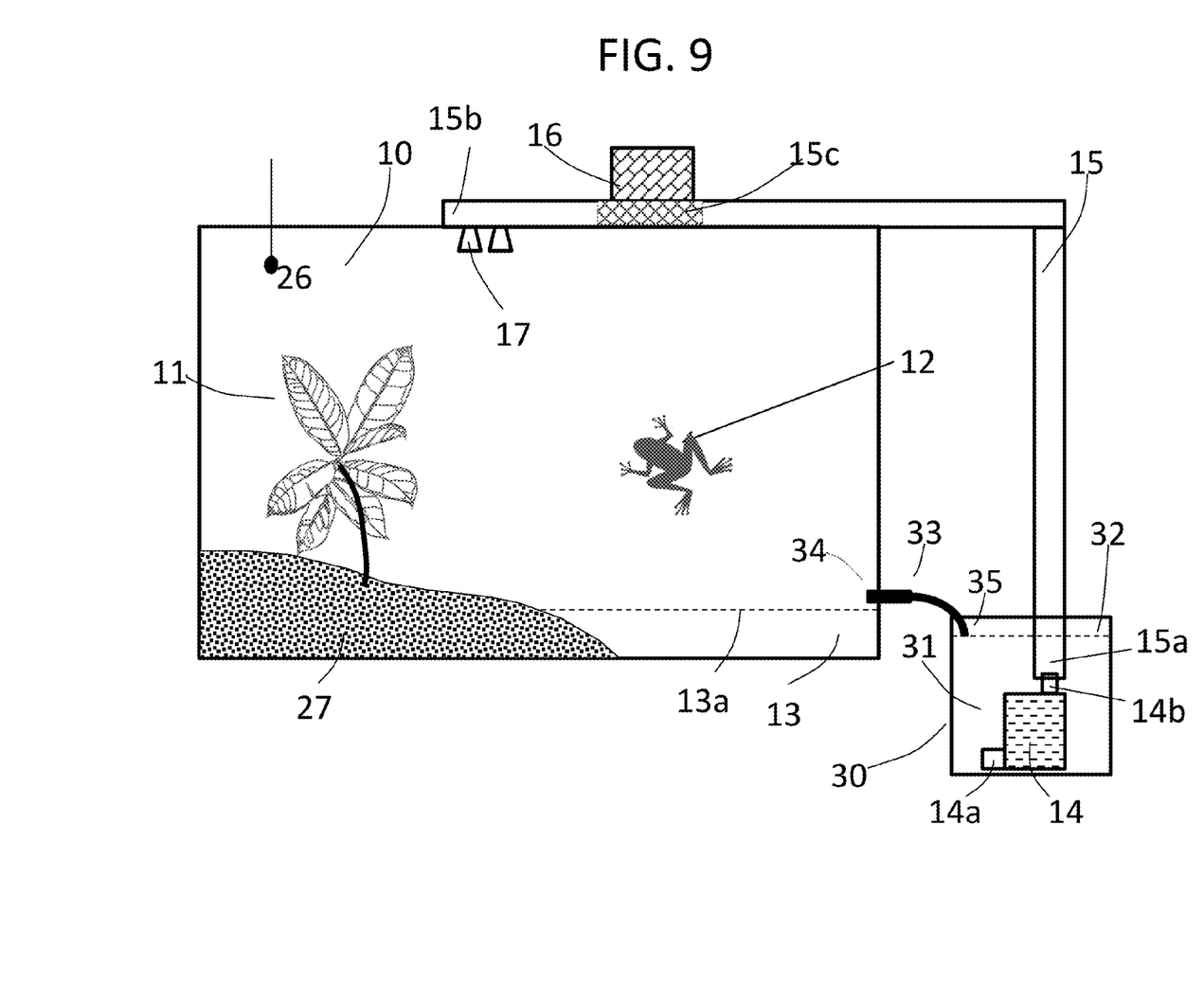
FIG. 9 is a schematic diagram of another embodiment of an integrated water droplet dispensing and heating/cooling apparatus for a terrarium that includes plants, and animals and an external reservoir.

Referring to FIG. 9 the terrarium system there illustrated is a different embodiment from that shown in FIG. 1 and comprises a terrarium enclosure 10. Inside the enclosure 10, there are plants identified with reference numeral 11, and animals identified with reference numeral 12. At the bottom of the enclosure 10, there is a mound of dirt 27 to support the plants 11 and an interior reservoir 13 which has a water level 13a. A container 30 resides outside the enclosure 10 and has a reservoir 31 with a water level 32. A water pump 14 resides inside the container 30 with its intake end 14a submerged in the reservoir 31 below the water level 32. One end 15a of water pipe 15 is connected to the outlet end 14b of the water pumper. Along the water pipe 15, there is an intermediate section 15c that is in thermal connection with the thermoelectric device 16 which is described in details in FIG. 2 through FIG. 7. And further along the water pipe 15, there are water droplet dispersing means 17 that are designed to provide water droplets when the water pump 14 is powered on. Moreover, to prevent water from overflowing the plants 11 inside the enclosure 10, there is an overflow discharge pipe 33 with one end 34 located inside the enclosure 10 aligned with the water level 13a and another end 35 above the water level 32 of the exterior reservoir 31. The water level 13a is higher than the water level 32. As such, when water pump 14 is powered on, water is drawn from the external water reservoir 31 by the water pump 14, and is pushed through the water pipe 15 and past the intermediate section 15c and the thermoelectric device 16, and finally to the water droplet dispersing heads 17 to provide the required water droplets. The addition of water droplets into the enclosure 10 will eventually raise the water level of the interior reservoir 13 above 13a. The excess water beyond the water level 13a will be drained through the overflow discharge pipe 33 into the exterior reservoir 31 thus keeping the water level inside the enclosure 10 at or below desired water level 13a. The control of water droplet dispersing and heating/cooling of the thermoelectric device 16 is illustrated in details in FIG. 8 and described above.

While the invention and exemplary embodiments of the invention have been illustrated and described in general and specific terms, it should be understood that the invention may be modified and otherwise embodied in still other forms, including but not limited to all forms which are obvious variants of or equivalent to those disclosed.

The preceding descriptions are by way of example and are not intended to limit or restrict the scope of the invention which is specified and defined by the appended claims.

I claim:

1. An integrated environmental sustaining apparatus for use in a terrarium system, wherein said apparatus simultaneously regulates temperature and delivers water droplets, wherein said apparatus comprises:

an enclosure and a water reservoir comprising:

a water pump powered by a first direct current power supply and located inside said water reservoir having a water intake end and a water outlet end with said intake end completely submerged in said reservoir;

a water pipe having a first end, a second end, an intermediate section that lies between said first end and said second end;

water droplet dispersing means attached substantially toward said second end of said water pipe;

a thermoelectric device having a first wire, a second wire, a first side and a second side; wherein said thermoelectric device is powered by a second direct current power supply having a positive terminal and a negative terminal; wherein said first side is a heat-absorbing side when said first wire is connected to said positive terminal and said second wire is connected to said negative terminal; wherein said first side is a heat-releasing side when said first wire is connected to said negative terminal and said second wire is connected to said positive terminal;

a thermostat having a least one temperature sensor located inside said enclosure, at least one actuator, and an input device adapted to be programmed to set a temperature range with a low temperature setting and a high temperature setting;

a common power source that provides power to said first direct current power supply and said second direct current power supply and is adapted to be switched On and off by said actuator of said thermostat responding to temperature measurements taken by said temperature sensor in relation to said temperature range;

wherein said water pump and said thermoelectric device are both powered on when said common power source is switched on by said actuator and said water pump and said thermoelectric device are both powered off when said common power source is switched off by said actuator.

2. A terrarium system as defined in claim 1, wherein said water reservoir is located inside said enclosure.

3. A terrarium system as defined in claim 1, wherein said water reservoir is located outside said enclosure.

4. An integrated environmental sustaining apparatus as defined in claim 1, wherein said first end of said water pipe is adapted to connect securely to said water outlet end of said water pump and said second end of said water pipe extends substantially to the top of said enclosure with water droplet dispersing means adapted to disperse water droplets inside said enclosure when said water pump is powered on.

5. An integrated environmental sustaining apparatus as defined in claim 1, wherein said first side of said thermoelectric device is in thermal contact with said intermediate section of said water pipe, and said second side of said thermoelectric device is exposed to ambient outside said enclosure.

6. An integrated environmental sustaining apparatus as defined in claim 1, wherein said intermediate section of said water pipe is preferably made of a thermally conductive material.

7. A terrarium system as defined in claim 1, further comprising heat dissipation means fitted to the said second side of said thermoelectric device; wherein said heat dissipation means comprises a plural of fins for increasing heat exchange surface and at least one air moving device for forcing air flowing past said fins.

8. An integrated environmental sustaining apparatus as defined in claim 1, wherein, when said common power source is powered on by said actuator in response to a temperature measurement by said thermal sensor that exceeds said high temperature setting and said first side of said thermoelectric device is a heat-absorbing side, said water pump draws water from said reservoir, pushes water into said water pipe and past said intermediate section thus releasing heat to said first side of said thermoelectric device, and delivers cooled down water to said water droplet dispersing means to deliver cool water droplets and to cool said enclosure at the same time.

9. An integrated environmental sustaining apparatus as defined in claim 1, wherein, when said common power source is powered on by said actuator in response to a temperature measurement by said thermal sensor that drops below said low temperature setting and said first side of said thermoelectric device is a heat-releasing side, said water pump draws water from said reservoir, pushes water into said water pipe and past said intermediate section thus absorbing heat from said first side of said thermoelectric device, and delivers warm water to said water droplet dispersing means to deliver warm water droplets and to heat said enclosure at the same time.

* * * * *